(12) United States Patent
Bräutigam (10) Patent No.: US 11,958,258 B2
(45) Date of Patent: Apr. 16, 2024

(54) METHOD FOR PRODUCING A FIBER-REINFORCED COMPONENT AND DEVICE FOR CARRYING OUT THE METHOD

(71) Applicant: UBC COMPOSITES GMBH, Murr (DE)

(72) Inventor: Ulf Bräutigam, Marbach (DE)

(73) Assignee: UBC COMPOSITES GMBH, Murr (DE)

( * ) Notice: Subject to any disclaimer, the term of this patent is extended or adjusted under 35 U.S.C. 154(b) by 338 days.

(21) Appl. No.: 17/057,244

(22) PCT Filed: May 22, 2019

(86) PCT No.: PCT/EP2019/063237
§ 371 (c)(1),
(2) Date: Nov. 20, 2020

(87) PCT Pub. No.: WO2019/224260
PCT Pub. Date: Nov. 28, 2019

(65) Prior Publication Data
US 2021/0162687 A1    Jun. 3, 2021

(30) Foreign Application Priority Data
May 22, 2018  (DE) .................... 10 2018 208 009.7

(51) Int. Cl.
*B29C 70/56* (2006.01)
*B29K 105/08* (2006.01)
(Continued)

(52) U.S. Cl.
CPC ...... *B29C 70/56* (2013.01); *B29K 2105/0845* (2013.01); *B29K 2307/04* (2013.01);
(Continued)

(58) Field of Classification Search
CPC ............ B29C 70/56; B29C 2053/8025; B29C 2049/7879; B29K 2105/0845
(Continued)

(56) References Cited

U.S. PATENT DOCUMENTS

| 6,174,483 B1 | 1/2001 | Brown, Jr. | |
| 2004/0118504 A1* | 6/2004 | Herrmann | B29C 70/56 156/160 |
| 2016/0075061 A1* | 3/2016 | Waas | D06M 15/564 264/231 |

FOREIGN PATENT DOCUMENTS

| CN | 101856872 A | 10/2010 |
| DE | 10259883 A1 | 6/2004 |

(Continued)

OTHER PUBLICATIONS

International Search Report, dated Jul. 31, 2019 in corresponding International Application No. PCT/EP2019/063237.

*Primary Examiner* — Galen H Hauth
*Assistant Examiner* — Hana C Page
(74) *Attorney, Agent, or Firm* — Amster, Rothstein & Ebenstein LLP (57) ABSTRACT

The present invention relates to a method for producing a fiber-reinforced component, comprising the step of providing a fiber material (2) impregnated with resin, having rovings (4) extending alongside one another at least in one direction. The object of the present invention is to provide a method, with which irregularities in the fiber material impregnated with resin can be reduced or even eliminated. The method is characterized by a step of stretching the fiber material (2), so that the rovings (4) align in their longitudinal direction. Furthermore, the invention relates to a device for carrying out the method according to the invention and to a fiber-reinforced component.

16 Claims, 6 Drawing Sheets

(51) Int. Cl.
 *B29K 307/04* (2006.01)
 *B29L 31/30* (2006.01)

(52) U.S. Cl.
 CPC ............ *B29K 2995/0026* (2013.01); *B29L 2031/3005* (2013.01)

(58) Field of Classification Search
 USPC ..................................... 264/288.4
 See application file for complete search history.

(56) References Cited

FOREIGN PATENT DOCUMENTS

| | | | | |
|---|---|---|---|---|
| EP | 0365677 | A1 | 5/1990 | |
| EP | 0394081 | A2 | 10/1990 | |
| EP | 0395036 | A2 | 10/1990 | |
| EP | 0480652 | A1 * | 7/1991 | ........... B29C 51/261 |
| EP | 0480652 | A1 | 4/1992 | |
| EP | 2589475 | A1 | 5/2013 | |
| EP | 2813539 | A1 | 12/2014 | |
| WO | 2005033390 | A2 | 4/2005 | |

\* cited by examiner

METHOD FOR PRODUCING A FIBER-REINFORCED COMPONENT AND DEVICE FOR CARRYING OUT THE METHOD

CROSS REFERENCE TO RELATED APPLICATIONS

This application is a national phase of PCT application No. PCT/EP2019/063237, filed May 22, 2019, which claims priority to DE patent application No. 102018208009.7, filed May 22, 2018, all of which are incorporated herein by reference thereto.

BACKGROUND OF THE INVENTION

The present invention relates to a method for producing a fiber-reinforced component, The use of resin-impregnated fiber materials for the producing fiber-reinforced components is widely known in the state of the art.

In EP 2 813 539 A1, a method is described in which a fiber material is provided. This is impregnated with a resin to produce a so-called prepreg material. Subsequently, this resin-impregnated fiber material (prepreg material) is cured under temperature and pressure to produce various components.

In EP 2 589 475 A1, for example, a method is described wherein filaments are processed from a roll into a flat fiber section which is subsequently impregnated with a resin composition. This resin-impregnated fiber material is then rolled up onto a further roll. The prepreg material can then be unwound from this further roll and cut into sections to produce a component.

In EP 03 656 77 A1, a method is described in which a fiber-reinforced component is produced from the prepreg material. In the method described in this document, the prepreg material is placed on a honeycomb structure material, then heated and consolidated to form the component.

In order to ensure a high throughput in the production of the prepreg material, the fiber material is often passed at high speed through the impregnation station where it is impregnated with resin. The prepreg material is also often rewound at high speed.

Due to the high speed or other process-related circumstances, structural irregularities or optically unfavorable surface areas may occur in the finished fiber-reinforced component.

Starting from this, the object of the present invention is to provide a method for reducing or even eliminating irregularities in the prepreg material.

SUMMARY OF THE INVENTION

In order to solve the problem described above, a method with the features of claim 1 is indicated.

The inventors of the present invention have established that it is possible to reduce or eliminate irregularities in the resin-impregnated fiber material by stretching the fiber material such that the rovings are aligned in their longitudinal direction.

In the present case, roving refers to a bundle or strand of multifilament filament consisting of filaments arranged in parallel. A roving can be any filament-like material, even if it is only built up on a single filament.

The production process of the resin-impregnated fiber material involves pressing, twisting or warping the rovings, which extend in one direction next to each other.

If the prepreg material is stretched so that the rovings running lengthwise side by side align, an improved surface quality is provided. On the one hand, the essentially straightened course of the rovings can then ensure a better force application. On the other hand, this also improves the optical appearance, because the areas where the rovings were pressed, twisted or warped show unfavorable reflection properties, especially in daylight. By stretching, the number of these areas with these unfavorable reflections is reduced and preferably avoided completely. In particular, it is advantageous to carry out the stretching until the number of areas with unfavorable reflections is below a given limit.

Examples of a resin material are polyester, polyurethane, phenol, cyanate ester, epoxy or a mixture thereof. The resin material can consist of these components or contain other additives.

Thus, the rejects on finished components can be minimized.

It has proven to be advantageous that the resin-impregnated fiber material is arranged in a planar configuration during stretching. For example, a planar sheet of the resin-impregnated fiber material is inserted into the device. A tensile force is for example exerted on this planar sheet only at its end(s) so that the rovings align in their longitudinal direction. When the resin-impregnated fiber material is fed from a roll, e.g. a roll of prepreg material, the section of the material to be stretched is essentially planar.

According to a further development of the invention, during stretching, a stretching force is applied only to a single end area or two opposite end areas of the corresponding rovings and/or essentially no vertical pressure force is exerted on the section of the fiber material to be stretched. Preferably, the section of the fiber material to be stretched is stretched when it lies on one side on a support or is freely spanned. During stretching, for example, no forming or pressure elements act on the section of the fiber material to be stretched.

It has proven to be advantageous to heat the fiber material at least before and/or during stretching where the resin with which the fiber material is impregnated is at least partially softened. Such heating can also be started shortly before stretching, e.g. until the resin is softened so that the rovings can align when tension is applied.

Preferred temperatures for heating are temperatures just below the melting point, at the melting point or slightly above the melting point of the resin used. The resin can be a single component, e.g. a polymer or a mixture of individual components, e.g. of different polymers, or with other additives.

Preferred temperature ranges for heating are between 25 and 130° C. Other preferred values are 40, 55, 70, 80, 90, 100, 115, 125° C. The corresponding values may each form upper and lower limits, respectively. Depending on the system used, especially the resin composition, the above mentioned temperatures are advantageous. The temperature may be used to adjust the viscosity. These values may each form upper and lower limits.

It has proven to be advantageous that heating is carried out for a duration of between 1 and 50 minutes. Other preferred values are 10, 20, 25, 30, 35, 40, 45 minutes. These values may each form upper and lower limits.

The temperatures in combination with the heating times form an optimal compromise in terms of speed of the method and ease of stretching.

After the resin-impregnated fiber material has been brought to the above-mentioned temperature and, for example, is kept at this temperature, it is advantageous to stretch the material in the range of 1 to 30 minutes, especially 5, 10, 15, 20, 25 minutes. These values can form upper and lower limits. If there is no active heating during stretching, the stretching should be carried out especially shortly after heating or immediately after heating.

By means of the aforementioned stretching times, it is possible to achieve the best possible alignment of the rovings without unnecessarily extending the process time.

In particular, a fiber material impregnated with resin can be a woven fabric made of rovings with weft and warp threads. It is generally sufficient for the method, if rovings extending alongside one another in at least one direction are provided. For the later component strength, however, it is advantageous to provide woven fiber materials that are impregnated with resin so that the rovings form weft and warp threads. In the following, the warp threads should define the longitudinal direction of the fabric and the weft threads the transverse direction of the fabric. The warp and weft threads are preferably aligned perpendicular to each other.

At least one of the groups of weft or warp filaments, in particular both of the groups of weft and warp filaments, can be stretched using the method according to the invention. This is because, depending on the use, it can also be advantageous to stretch only the weft or warp filaments; or to stretch both the weft and the warp filaments. The latter procedure complicates the method in that the stretching must be carried out in two directions at least. However, the material quality of the finished components can be significantly improved here.

It has proven to be advantageous that the stretching of the fiber material is carried out by friction. This friction can be exerted on protruding ends of the rovings extending in at least one direction next to each other. A section of a fiber material, even if it comes from the roll, may have protruding ends in the longitudinal direction and/or in the transverse direction. At these protruding ends the rovings protrude from the material. This is where the individual rovings can best be gripped and stretched.

Due to the resin, especially when it has been heated, a translational movement of a stretching surface of a stretching element can be applied to the corresponding ends, which, for example, otherwise lie freely on this stretching surface. This allows the rovings to be aligned in the longitudinal direction.

By stretching using friction, a simple procedure can be provided. If the ends rest freely on this stretching surface, it is not necessary to hold the entire ends with two jaws of the clamping bar or the like. This stretching surface can be moved translationally, against the direction of the filaments.

It has proven to be advantageous that the protruding ends of the resin-impregnated fiber material are free ends protruding free of fiber material and limiting it. These ends are short ends, and are freely supported so that they can untwist during stretching to reduce the stresses generated during stretching.

In particular, the protruding ends of the rovings can be exposed by removing one or more weft or warp filaments running transversely to these ends of the rovings.

The material section usually has a straight cut end and therefore a straight end edge. In order to better introduce the stretching force into the section, at least one roving (at least one weft or warp filament, depending on the orientation) running transversely to the ends of the rovings to be stretched is removed. Preferably, several rovings, especially 2, 5 or 10 transverse rovings are removed.

The stretching force is then only applied over the exposed ends where the transverse rovings are removed. The rovings can be removed manually or by an automated process. After insertion of the section to be stretched, the end to be stretched is detected and the transverse roving(s) are removed using a robot.

In particular, it is advantageous that the rovings to be stretched are fixed, at least during stretching, at their end opposite the end on which the friction is applied. Such a fixation can be achieved with a clamping element, which for example has two jaws, which after clamping between them take up at least the ends of the rovings. It is not necessary that the rovings are held fixed at their free end. A configuration may also be provided in which an area of material opposite the end of the material to which the stretching force is applied is held fixed.

By providing such clamping jaws, a whole series of adjacent rovings can be stretched simultaneously.

Alternatively, each individual roving can be gripped with a gripping element and stretched individually. Stretching can therefore be carried out such that during the stretching process, a whole series of adjacent rovings are stretched simultaneously, as described above with respect to the stretching surface, or that selectively individual rovings which have been previously defined, for example because they have been identified as twisted, are gripped and stretched.

This can also improve the quality of the end product.

The friction exerted on the protruding ends can be entered via a stretching surface of a roller element. The roller element can be rotated in longitudinal direction to the rovings to be stretched. The rovings lie e.g. freely on the rolling element.

As an alternative to this roller element, a translationally displaceable stretching element can also be provided, with a stretching surface that can be translationally displaced in the longitudinal direction of the rovings to be stretched. The rovings to be stretched rest freely on this stretching surface of the translationally displaceable stretching element.

Due to the translatory movement of the translationally displaceable stretching element or via the rotary movement of the roller element, for example, a stretching force is exerted on the rovings, mediated by the softened resin, in order to align them in the longitudinal direction.

It has turned out to be practical to use a cylindrical, in particular round or angular roller element.

According to a preferred further development of the invention, said roller element or also the translationally displaceable stretching element can be heated. This heater can be provided as a second heater in addition to a first heating device described above, which heats the fiber material so that the resin is at least softened.

Further improved stretching can be achieved by heating.

In particular, the consistency of the resin can be selectively varied by controlling this second heater, which can also be used as the only heating device, e.g. if it only heats individual areas in their longitudinal direction. Thus, the stretching of the fiber material can be selectively influenced.

According to a further development of the invention, a stretching element different from that for stretching the warp filaments may be provided for the insertion of the weft filaments.

These different stretching elements are, for example, arranged perpendicular to each other in the plane of the fiber material, wherein the stretching of the weft and warp filaments can take place simultaneously or concurrently via the various roller elements.

The at least two stretching elements can also be different in their geometry. For example, a rotationally movable plug-in element, such as the roller element described above, or a translationally movable plug-in element may be provided.

The warp filaments can be stretched before, after or during the stretching of the weft filaments by means of the method.

It has turned out to be advantageous that a cooling step is carried out after the stretching process, in which the stretched, resin-impregnated fiber material, which can form a semi-finished product for the production of a later component, is cooled down, especially to room temperature.

A cooling rate of between 0.5 and 10° C. per minute is advantageous. Other advantageous values are 1; 1.5; 2.5; 3; 5; 7; 10° C. per minute. The corresponding values can form upper and lower limits.

After stretching and/or after cooling, an active relaxation of the stretched, resin-impregnated fiber material can be carried out. After such stretching, tensions are often still present in the fiber material. Stretching was performed to improve the alignment of the rovings. In order to eliminate the tensions, it is advisable to carry out an active relaxation. This can be done immediately after stretching and before cooling or after stretching and before cooling. The relaxation can be carried out by means of ultrasound and/or vibration or with any other device that allows the material to relax.

The method can be carried out such that a protective film provided on the resin-impregnated fiber material is removed before stretching. The same protective film or a different, e.g. new, unused protective film can be reapplied after the stretching of the fiber material. In particular, such a protective film is provided on both sides of the fiber material (e.g. at the top and bottom) and is also re-applied to both sides. Alternatively, such a protective film can also be provided on one side only and/or applied to one side. The process can also be carried out such that only one of two protective films applied to both sides of the fiber material is removed and the other film remains adhered to the material during stretching.

By means of such a protective film, the semi-finished product is protected from environmental influences and kept ready for transport.

The prepreg material, for example, is delivered on a roll, wherein the prepreg material wound up on the roll is provided with such a protective film on both sides. For stretching the material, the protective film is removed from one, preferably both sides, and after stretching the same protective film or another protective film can be applied again on one or both sides of the material.

The protective film can also be removed such that in an automatic process, the protective film is lifted off the top and bottom sides and moved at the same speed as the prepreg material without protective film in the longitudinal direction simultaneously with the prepreg material without protective film, but spaced apart from it.

The prepreg material can then be stretched in the area where the protective film is guided spaced apart from the prepreg material. For this purpose, the transport device guiding the prepreg material can be stopped and the material is stretched in transverse direction to the transport direction. After stretching, the material is conveyed further and the protective film is brought back together with the stretched material. The prepreg material can then be rolled up.

As an alternative to the subsequent rolling up, the prepreg material can also be cut to size immediately after stretching without rolling it up again. This can be done in a cutting station which is located downstream of the stretching station.

This material blank is then used, for example, in the further method for the production of the fiber-reinforced component.

This blank can also be laminated with other blanks to form a semi-finished product which is then fired in an autoclave under temperature and/or pressure, for example, to form the finished fiber-reinforced component.

It is advantageous if the roll or blank is taken from a warehouse with a large number of pre-fabricated resin-impregnated fiber material units and fed to a stretching device. The units of resin-impregnated fiber material, e.g. units of prepreg, are often kept in a warehouse before they are used further. When the corresponding component is produced, this material is stretched just-in-time using the method according to the invention. It has proven to be advantageous to carry out an inspection, especially optical inspection, during, before or after the stretching process.

Thus, the change in material can be observed instantly and e.g. the duration of stretching and/or other of the previously mentioned parameters (heating etc.) can be varied accordingly. It can be inspected to what extent e.g. the number of areas with unfavorable reflections is below a given limit value and/or other given properties or conditions are fulfilled by the stretching process. For example, the surface can be inspected before and after the stretching process with an automated image processing program and the stretching process can be performed automatically by a control system such that the number of areas with unfavorable reflections is below a predefined limit value and/or other predefined properties or conditions are fulfilled by the stretching process.

In addition to the steps of automated inspection in connection with the stretching process, individual or further parts or steps of the process can also be automated, in particular by means of a control system.

For example, the feeding of the material can be automated. Stretching, heating, cooling and/or removal of the material from the stretching device can also be done automatically.

The method according to the invention is particularly suitable for the production of fiber-reinforced components for a motor vehicle. The motor vehicle component has, for example, a Class A surface, wherein the Class A surface is a visible carbon surface. Any other visible carbon surface, where an optically flawless effect is required, can also be produced using the method according to the invention. The component is therefore not limited to the automotive sector. Class A is a common definition of the quality of components/surfaces in the automotive industry. A distinction is made between Class A, Class B, and Class C. Class A are exposed outer skin components such as fenders, hoods and roofs. Class A surfaces are therefore visible (free-form) surfaces in the exterior and interior area. Class A surfaces show e.g. curvature stability.

According to a parallel aspect of the invention, a device for carrying out the method according to the invention is also indicated. The device has at least one stretching element which is configured to stretch the fiber material so that the filaments are aligned in their longitudinal direction.

Such a stretching element can be formed by the roller element described above or alternatively by the translationally movable stretching element described above. The stretching element has, for example, a stretching surface on which the protruding ends of the rovings of the resin-impregnated fiber material rest freely.

According to a preferred development of the device, a clamping element can be provided which is configured to fix the rovings at the end opposite to the end where the rovings interact with the stretching element. Such a clamping element can be the clamping element described above which has, for example, two jaws which, after clamping between them, receive at least the ends of the rovings. By providing such clamping jaws, a whole series of adjacent rovings can be stretched simultaneously.

Insofar as the fiber material is a fabric with warp and weft filaments, at least two stretching elements as described above may be provided, one stretching the warp filaments and the other stretching the weft filaments.

Preferably, each of the first or second stretching element is opposite a corresponding clamping element.

The stretching elements can form a stretching station in combination with an optional heater for heating the material and/or a cooling device for cooling after stretching and/or an active relaxation device.

This stretching station can be arranged downstream of a cutting station, which is configured to produce a fiber material blank from the stretched fiber material. From this blank, a fiber-reinforced component is then produced after one or more further steps, such as firing in an autoclave.

According to a further parallel aspect of the invention, a stretched, fiber-reinforced component is indicated which is produced by the method according to the invention. It is also possible that the intermediate product, the stretched (e.g. not yet fired) semi-finished product, which has been produced with the present method, constitutes the invention in itself.

In particular, the component can be a motor vehicle component, but can also be any other component in the field of aerospace technology or medical technology.

In particular, the component has a surface area of more than $0.1 \text{ m}^2$, more than $0.5 \text{ m}^2$, more than $1 \text{ m}^2$, more than $10 \text{ m}^2$.

Especially with such large components, it is difficult to produce a surface with the same quality. This is why the method is particularly preferred for such components.

The motor vehicle component may in particular be a visible motor vehicle component such as a mudguard, a roof, a hood or a spoiler.

In particular, the method allows this component to be a visible carbon component, i.e. this component can only be coated with clear varnish, so that the fabric structure is visually visible.

The risk of unfavorable optical reflections due to twisted, pressed or warped rovings can be reduced.

By the method according to the invention it can be ensured in particular that the reflections or reflexes formed by twisting and/or distortion of the rovings at grazing light incidence are reduced to a number of less than $5/\text{dm}^2$, in particular of less than $2/\text{dm}^2$, especially of less than $1/\text{dm}2$ ($\text{dm}^2$=square decimeter).

These values are e.g. averaged values over a large number of cut-outs with e.g. 10 cm×10 cm area.

When using commercial mass produced prepreg materials for Class A surfaces, such surface brilliance cannot be guaranteed.

In case of conventional prepreg sections from conventional mass production, such as those used to produce the components, the resin material is applied with pressure. This causes individual rovings to twist and/or tilt. After curing, e.g. in an autoclave, the resin solidifies, but the twisting and/or tilting of the rovings remains. This leads to reflections or reflexes formed by grazing light incidence due to light reflected from these twisted and/or tilted rovings.

In the case of components for which the stretching method according to the invention was not applied, a number of more than 50 reflections or reflexes per $\text{dm}^2$ is usual after curing.

Thus, the finished components, such as engine hoods, contain a large proportion of rejects.

In particular in case of visible carbon components, it is important that the human eye sees no or only very few reflections or reflexes.

The configurations described for the above-mentioned method can also be extended to the device in each case insofar as, for example, a heating step is involved, a heating device may be provided with which the fiber material is heated. Cooling can be done with a cooling device.

BRIEF DESCRIPTION OF THE DRAWING

Further preferred configurations of the invention are described by means of the following embodiments in connection with the drawing. Therein:

FIG. 1 shows a schematic stretching station, wherein one stretching element is configured as a roller element;

FIG. 2 shows a schematic top view of the embodiment from FIG. 1a;

FIG. 5b shows a top view of the embodiment from FIG. 5a;

FIG. 5c shows a side view of the device from FIG. 5a;

FIG. 6b shows a top view on the device from FIG. 6a;

FIG. 6d shows a cross-sectional view of the device from FIG. 6a along the line A-A.

DETAILED DESCRIPTION OF PREFERRED EMBODIMENTS

Figures 1A, 1B:
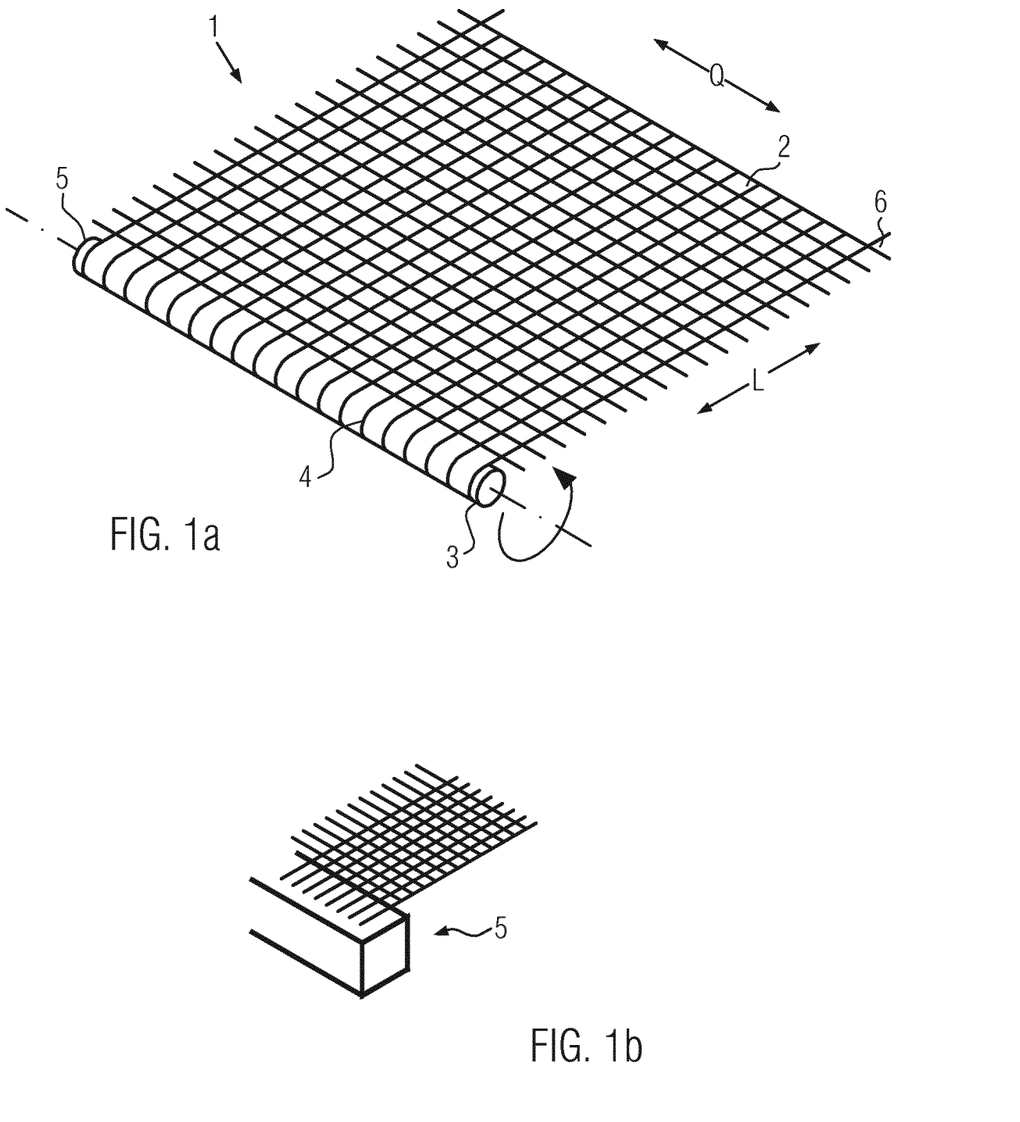
FIG. 1a shows a schematic stretching station wherein the stretching element is a translationally displaceable stretching element.
FIG. 1b shows a section of an alternative stretching station, wherein the stretching element is a translationally displaceable stretching element.

FIG. 1a schematically shows a section of a stretching station 1. A section of resin-impregnated fiber material 2 is arranged such that projecting ends 3 of rovings 4 extending alongside one another in one direction rest loosely on a stretching surface of a stretching element 5 without being held squeezed between a further element. At its opposite end 6, the resin-impregnated fiber material 2 is firmly clamped in a clamping element 7 (which is not shown in FIG. 1, see FIG. 2) so that it cannot be moved translationally in its longitudinal direction L. The section of resin-impregnated fiber material 2 can be one end of a section of resin-impregnated fiber material 2 unwound from a roll 8 (see FIG. 4, left side). This resin-impregnated fiber material 2 is also called prepreg and can be a semi-finished product.

In the present embodiment in FIG. 1a, the resin-impregnated fiber material 2 contains a fabric of rovings 4 with weft and warp filaments. In the present embodiment, the weft filaments should be the rovings in longitudinal direction L of the section, with warp filaments being formed by the rovings 4 in transverse direction Q of the section. However, the weft and warp filaments can also be interchanged so that the weft filaments are formed in the transverse direction of the section and the warp filaments in the longitudinal direction. Instead of a roll material, which is unrolled lengthwise and whose end is clamped in the stretching station 1, a separate, flat section of a fiber material impregnated with resin can also be used. This can be square, rectangular or any other shape. Such a section can have a surface area of 0.5 to 20 m². The following values are also possible 1 m², 4 m², 6 m², 8 m², 10 m², 15 m². The above mentioned values can each be used as upper and lower limits of a preferred area.

To date, it has not been possible to produce such large sections in such a high quality that irregularities or fewer irregularities are avoided in the later finished tool or component.

The stretching station is therefore configured such that material sections can be stretched with the above mentioned sizes. In particular, the size refers to the area held between the plug-in element 5 and the clamping element 7.

In the embodiment in FIG. 1a, a roller element is provided as stretching element 7. The roller element presently has a round shape with a rotatably turnable stretching surface. Any other roller element can also be provided. Such a roller element has at least one plug-in surface and is rotatably mounted so that when the roller element 7 is rotated, the stretching surface is moved such that the adjacent rovings are stretched.

In FIG. 1b, an alternative embodiment of a stretching element 5 is provided schematically. A translationally movable stretching element with a stretching surface is shown there. Said stretching element has a square cross-section. Any element can be provided as a translatory stretching element that has a stretching surface which is moved translationally with respect to the longitudinal direction L of the rovings 4 aligned alongside each other. Both the rotary turning in FIG. 1a and the translatory stretching in FIG. 1b exert a force on the ends of the fiber material 2 so that the material is stretched.

In particular, the material is heated before and/or during stretching so that the resin impregnated into the fiber material is softened. In particular, a heating temperature of app. 25 to 130° C. is advantageous. Other advantageous values are 40, 55, 70, 80, 90, 100, 115, 125° C. The corresponding values can form upper and lower limits. Depending on the system used, especially the resin composition, the above mentioned temperatures are advantageous. These values can form upper and lower limits.

It has been proven to be advantageous to carry out heating for a duration of between 5 and 50 minutes. Other advantageous values are 10, 20, 25, 30, 35, 40, 45 minutes. These values can form upper and lower limits.

The temperatures in combination with the heating times form an optimal compromise in terms of speed of the method and ease of stretching.

After the resin-impregnated fiber material has been brought to the above-mentioned temperature and, for example, is also kept at this temperature, it is advantageous to stretch the material in the range of 1 to 30 minutes, especially 5, 10, 15, 20, 25 minutes. These values can form upper and lower limits. If there is no active heating during stretching, the stretching should be performed shortly after heating or immediately after heating.

The above mentioned stretching times allow the rovings 4 to align in the best possible way without unnecessarily extending the duration of the method.

Figure 4:
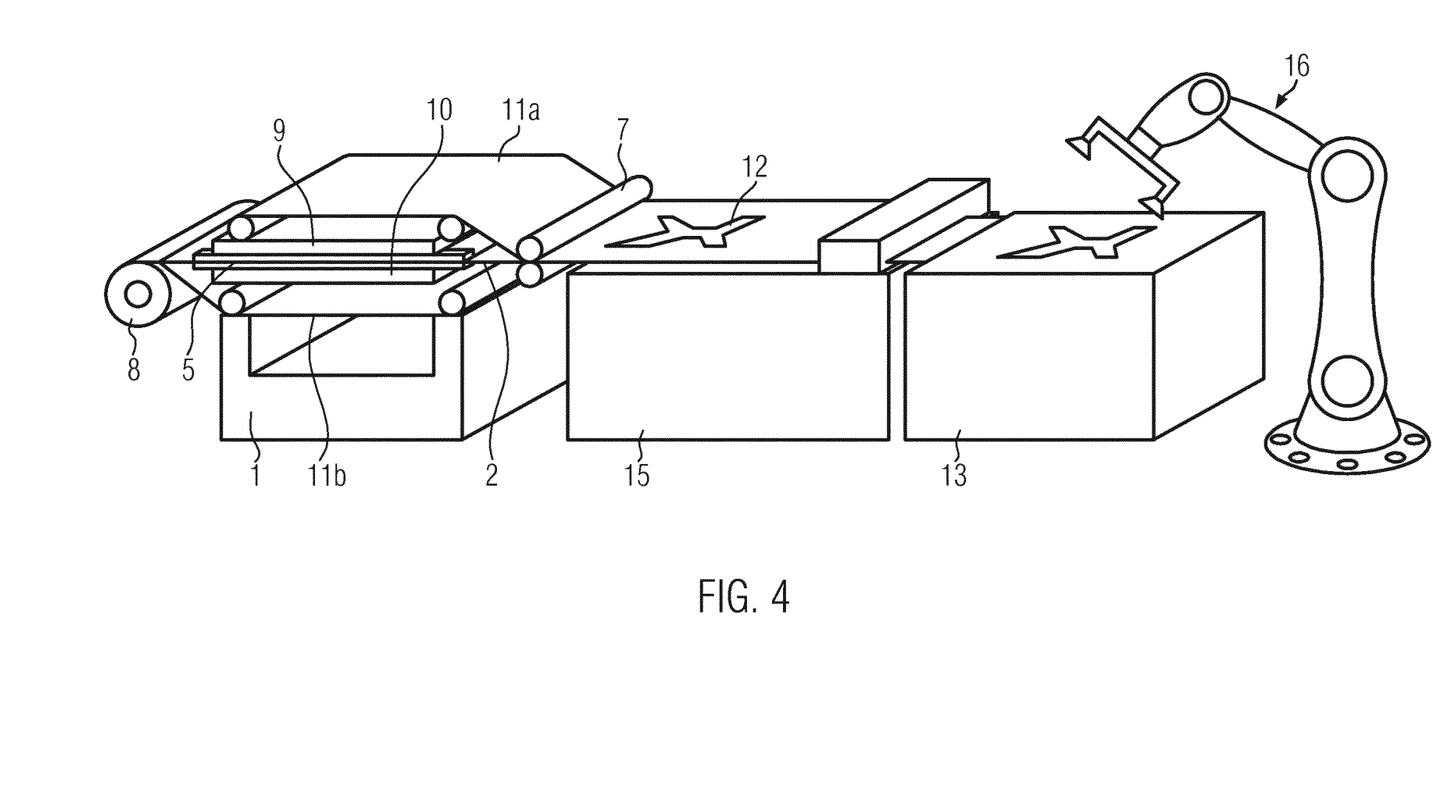
FIG. 4 shows a schematic diagram of a device in which the resin-impregnated fiber material is supplied from a roll, stretched, cut to size and later the finished blank is or can be removed, all in one line and automated.

Heating can be done with any type of heating or heating device. The resin-impregnated fiber material 2 can be guided over a warm surface or can be subjected to warm air. Warm air can be introduced with a blower in the manner of a dryer, for example. An example of a heating device is shown in FIG. 4 with reference sign 9. In this example, the heating device 9 is designed as a plate element which abuts the resin-impregnated fiber material on the upper side or is provided in the vicinity of the fiber material and spaced apart from it so that it can heat it.

Figure 3:
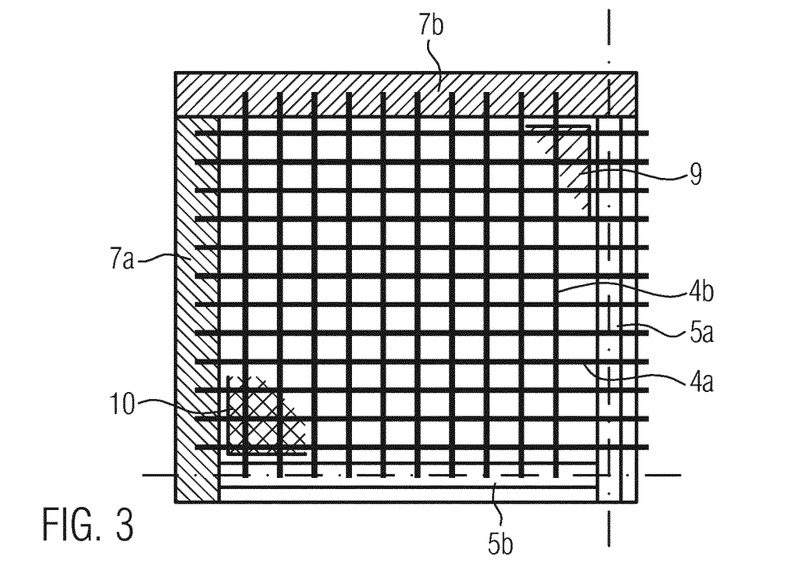
FIG. 3 shows another embodiment where weft and warp filaments of the fiber material are stretched in the stretching station.

Since this heating device 9 is provided as a plate element, it is only shown schematically by the hatching in FIG. 3, because FIG. 3 shows a top view of a further embodiment.

During and/or after heating, stretching is then carried out by moving the stretching element 5, for example, rotationally or translationally so that the free ends of the rovings 4 resting on the corresponding stretching surface of the stretching element are drawn such that the rovings 4 align in their longitudinal direction.

The stretching can be done with a duration of 10 to 30 minutes, in particular 15, 20, 25 minutes. The corresponding values can form upper and lower limits.

Instead of the stretching elements 5 shown in the embodiments from FIGS. 1a and b, in which the ends of the rovings are stretched essentially over the entire width of the fiber material 2, only individual sections in the fiber material can be stretched so that only certain areas of ends interact with a stretching element 5.

Alternatively, single rovings can be gripped and stretched selectively with grippers, e.g. in the manner of tweezers.

For this purpose, it is advantageous, for example, that an optical visualization device and/or a computer routine can be used to automatically determine the points at which twisting, pressing or warping occurs in the material.

This determination of the location of irregularities introduced into the material by twisting, pressing and/or warping can also be done manually by a person taking a close look at the material and determining the places where such pressing, twisting and/or warping of the rovings occurs.

Afterwards, the stretching element 5 then acts on the rovings until at least the number of defects due to pressed, warped or twisted rovings is below a certain limit value or is completely eliminated. In particular, the rovings are to be considered as stretched or no longer twisted if no more irregularities in the surface can be detected optically and/or with the naked eye in daylight and/or solar radiation.

If the prepreg material is stretched so that the rovings running alongside each other in the longitudinal direction are aligned, an improved surface quality is provided. On the one hand, the essentially straightened course of the rovings can then ensure a better application of force. On the other hand, this also improves the visual appearance, because the areas where the rovings were pressed, twisted or warped exhibit unfavorable reflection properties, in particular in daylight. By stretching, the number of these areas with the unfavorable reflections is reduced and preferably avoided completely. In particular, it is advantageous to continue stretching until the number of areas with unfavorable reflections is below a given limit.

Figure 2:
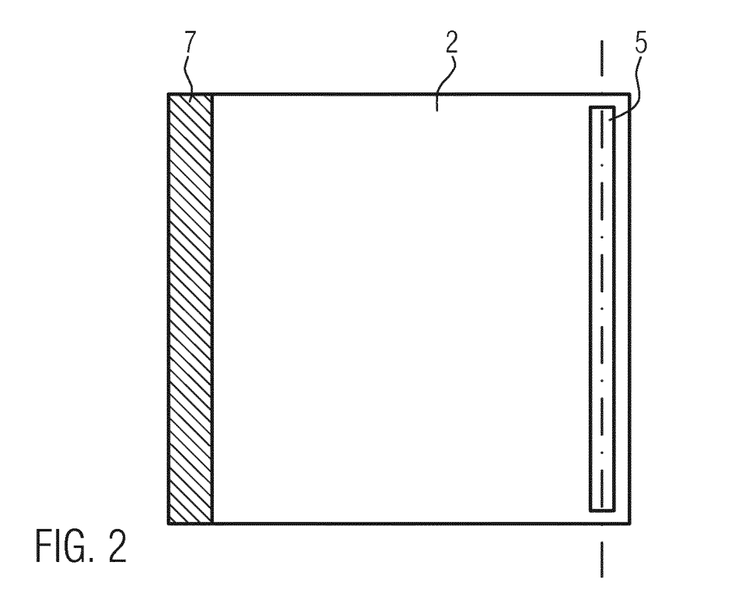

FIG. 2 shows a schematic view of the devices from FIGS. 1a and 1b.

Here it can be seen that the stretching element 5 is opposite the clamping element 7 in the plane in which the fiber material extends. The clamping element 7 generates an opposite force in the longitudinal direction L to the rovings 4, opposite to the force exerted by the stretching element 5 on the rovings 4. This clamping element 7 can be ensured by clamping jaws or any other type of clamping.

In an alternative embodiment in FIG. 3, a situation is shown schematically in which not only the fibers are stretched in a single direction, for example the longitudinal direction in FIGS. 1a and 1b, in particular the warp filaments, but in which both the warp and the weft filaments, in particular at an angle of 90°, are stretched in relation to each other by means of corresponding stretching elements 5a and 5b.

In doing so, the corresponding ends of the rovings 4b, which form the warp filaments, for example the filaments running from top to bottom in FIG. 3, are stretched by the stretching element 5b in cooperation with the clamping element 7b.

In addition, the corresponding ends of the rovings 4a which form the weft filaments, for example the filaments running from left to right in FIG. 3, are stretched by the stretching element 5a in cooperation with the clamping element 7a. In the embodiment, the first and second clamping elements 7, 7b are provided opposite the first and second stretching element 5a, 5b.

The corresponding clamping elements can have the same configuration as described for the embodiments in FIGS. 1a and 1b.

Unless otherwise described in the following for this embodiment as well as for the further embodiments, the configurations as described for the embodiments in FIGS. 1a, 1 b are also possible for these embodiments. All aspects described below can also be combined with the embodiments from FIGS. 1a and 1b and all other embodiments, unless this is technically unreasonable.

In the present embodiment from FIG. 3, a heating device 9 is also provided. In addition, a cooling device 10, as shown in FIG. 4, may also be provided here.

As shown in FIG. 4, the cooling device 10 can also be formed from a plate element opposite the plate element defining the heating device 9.

By cooling the plate element, it is then possible to cool the stretched material after stretching. Alternatively or additionally, a cold air blower or liquid cooling can be provided as cooling device.

It has proven to be advantageous that a cooling step is carried out after the stretching process, in which the stretched resin-impregnated fiber material, which can form a semi-finished product for the manufacture of a later component, is cooled down, especially to room temperature.

A cooling rate of between 0.5 and 10° C. per minute is advantageous. Further advantageous values are 1; 1.5; 2.5; 3; 5; 7; 10° C. per minute. The corresponding values can form upper and lower limits.

Cooling can be performed before, during and/or after an optional relaxation step.

After the stretching step, stresses have usually been introduced into the impregnated fiber material. These stresses can also have an unfavorable effect on the surface and tensile properties of the finished component. Therefore, it is advantageous that when the corresponding rovings 4 are aligned, relaxation takes place. This can be done with vibration or ultrasound treatment. A corresponding vibrating device or ultrasonic device is not shown in the present embodiments.

A relaxation device can, for example, be configured such that the plates forming the heating device 9 and/or the cooling device 10 are vibrated by a motor or subjected to high-frequency vibration such as ultrasound. However, the material and/or the plates can also be vibrated manually.

This can be done before a possible cooling down, during or after a possible cooling down.

In the embodiment from FIG. 3, the stretching elements 5a, 5b, which are arranged perpendicular to each other, can be rotated independently of each other. In the area of the crossing point in FIG. 3 bottom right, however, a gear unit can be provided that movably couples the two stretching units 5a, 5b with each other so that the drive can be effected via a drive shaft for both stretching elements.

For the embodiment from FIG. 3, it is advantageous that only individual sections, in particular square sections, are introduced into the device. However, in this example the material can also be introduced from a roll.

FIG. 4 shows a further embodiment in which the stretching and also the subsequent trimming and removal steps are automated or semi-automated.

In the embodiment of FIG. 4, only the corresponding rovings that run in the transverse direction are stretched, because the resin-impregnated film material is unwound from a roll 8. In this process, a protective foil 11a or 11b, which is provided on the top or bottom side of the resin-impregnated fiber material 2, is lifted off the material. The protective film 11a, 11b is then guided in longitudinal direction at the same speed as the exposed resin-impregnated fiber material 2 and then pressed back onto the surface in the clamping element 7.

The clamping element 7 in this case therefore also serves as a protective foil pressing element.

In the present case, the clamping element 7 is thus formed by two opposite rolls which also pull the film through the stretching device.

In the stretching station 1, the heating device 9, configured as a heating plate, is provided on the upper side of the resin-impregnated fiber material and a cooling device 10, configured as a cooling plate, is provided on the lower side of the resin-impregnated fiber material.

The resin-impregnated fiber material passes between the two plates.

Two rolls running in opposite directions in the longitudinal direction are provided here, which accommodate and stretch the ends of the transverse rovings 4 between them. However, any other type of stretching element, e.g. the stretching elements described above, can also be provided.

By heating the material and actuating the stretching element by rotary and/or translatory movements of the stretching surface, the adjacent rovings can be stretched.

After this stretching, the stretched material can be cooled down again and reapplied with the protective film.

In the present example, a blank 12 is cut out of the material in a further cutting station 15 downstream of the stretching station 1. Such a blank can be made by a mechanism known per se to the textile industry, for example by an automatic laser cutting device cutting a predetermined pattern into the stretched material.

In a removal station 13 downstream of the cutting station 15, for example, the blanks 12 can be removed by a robot 16.

These blanks 12 can then accordingly be laminated and/or formed into the finished components, e.g. by firing them in an autoclave at a certain temperature and under certain pressure conditions.

In particular, the components are motor vehicle components, in particular visible motor vehicle components, for example particularly large components which are only coated with clear lacquer and/or, where the fabric structure is visually visible.

On the one hand, the stretching process ensures that the surface has an excellent visual appearance. On the other hand, it is also possible to better direct the application of force into the individual rovings than is the case when the individual rovings 4 are pressed, twisted and/or warped.

FIG. 4 does not show that during the stretching process a visualized, especially automated visualized observation of the resin-impregnated fiber material can take place.

It has proven to be advantageous to carry out an inspection, especially a visual inspection, during, before or after stretching.

Thus, the change in the material can be observed instantly and e.g. the duration of the stretching and/or other of the previously mentioned parameters (heating etc.) can be varied accordingly. It can be inspected to what extent e.g. the number of areas with unfavorable reflections is below a given limit value and/or other given properties or conditions are fulfilled by the stretching process. For example, the surface can be inspected before and after the stretching process with an automated image processing program and the stretching process can be performed automatically by a control system such that the number of areas with unfavorable reflections is below a given limit value and/or other given properties or conditions are fulfilled by the stretching process.

In addition to the steps of automated inspection in connection with the stretching process, individual or further parts or steps of the process can also be automated, in particular by means of a control system.

For example, the feeding of the material can be automated. Stretching, heating, cooling and/or removal of the material from the stretching device can also be done automatically.

If, for example, a prefabricated quality has been achieved, the stretching time can be adjusted accordingly.

In contrast to the embodiment shown in FIG. 4, downstream of the stretching station 1, it can also be simply a rewinding station, in which the stretched material is rewound onto a roll and delivered for further processing.

Figure 5A:
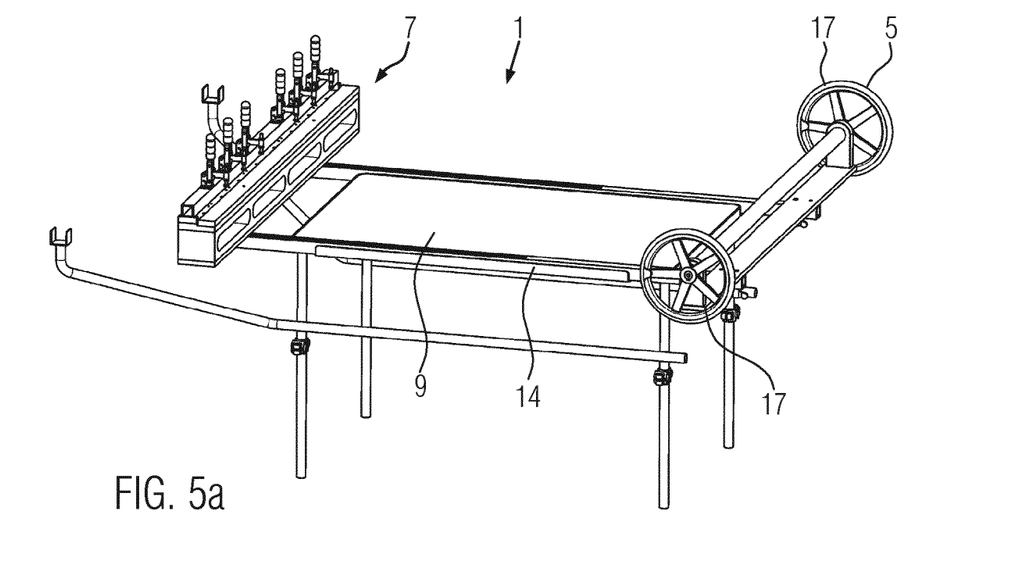
FIG. 5a shows a top view of a device in which the rovings running in longitudinal direction are stretched.

FIG. 5a shows a diagonal view of a stretching station 1, which works similar to the one in FIG. 1a. The stretching station is constructed like a stretching table.

The clamping element 7 is provided on the left side shown in FIG. 5a. On the right side shown in FIG. 5a, the stretching element 5 is provided. In the present case, the stretching element 5 is a roller element with a round cross-section and two wheels 17 at its longitudinal ends. Via the wheels 17, the stretching element can be rotated by hand, thus stretching the material.

The stretching element 5 is supported on a lengthwise movable rail segment 14. Similarly, the clamping element 7 is supported in the longitudinally movable rail segment 14. This allows selective adjustment of the distances at which the resin-impregnated fiber material 2 is clamped and the point at which the stretching element 5 acts on the rovings 4.

Figure 5B:
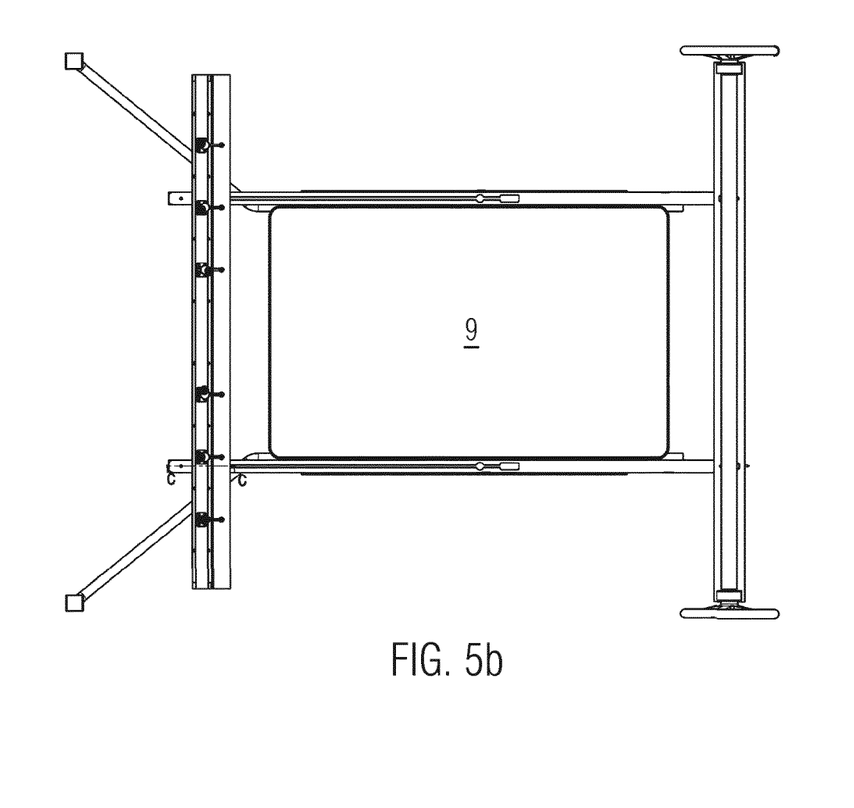

FIG. 5b shows a top view of the embodiment from FIG. 5a.

With reference sign 9, a plate element is designated, which serves as heating device and also as cooling element.

The resin-impregnated fiber material 2 is installed in the stretching station 1 such that the surface lies against the plate element 9 or is stretched at a small distance from the plate element.

In this way, a heating or cooling of the material can be guaranteed in the course of the method.

Figure 5C:
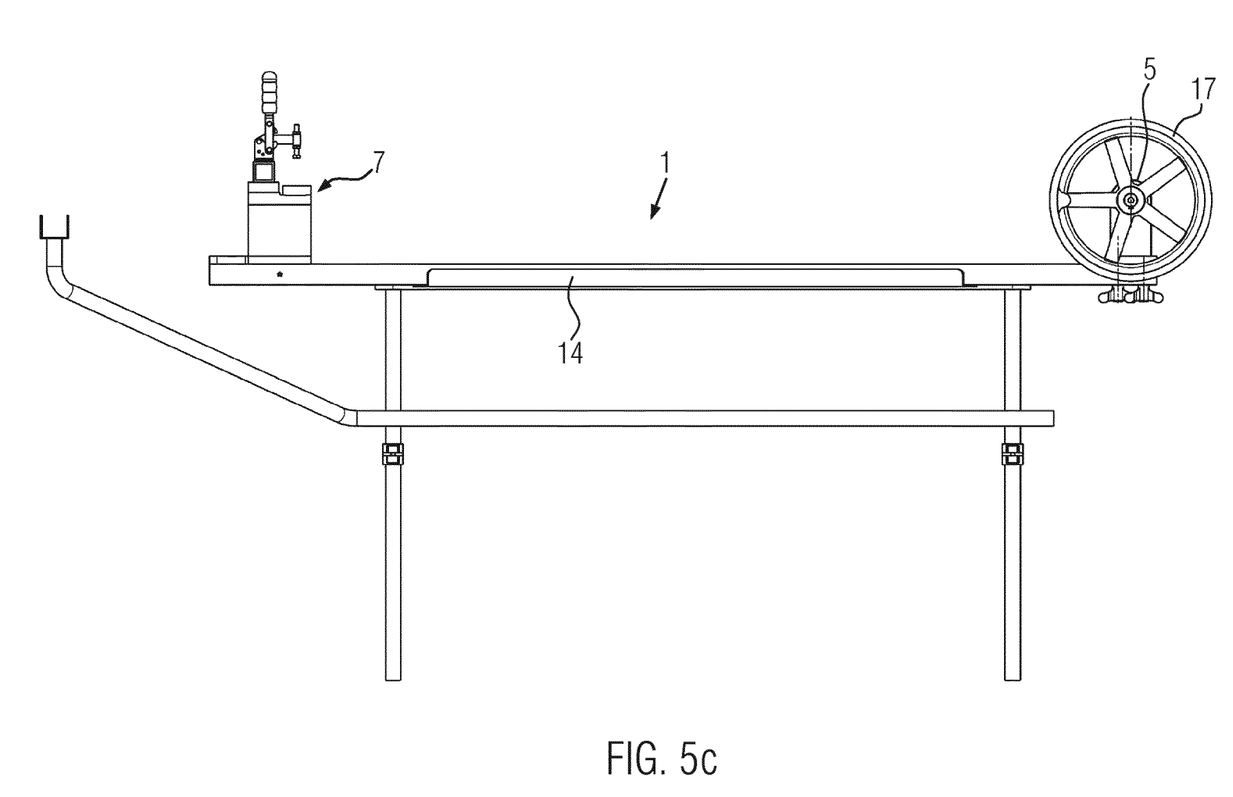

FIG. 5c shows a cross-sectional view of the stretching station from FIG. 5a.

Figure 6A:
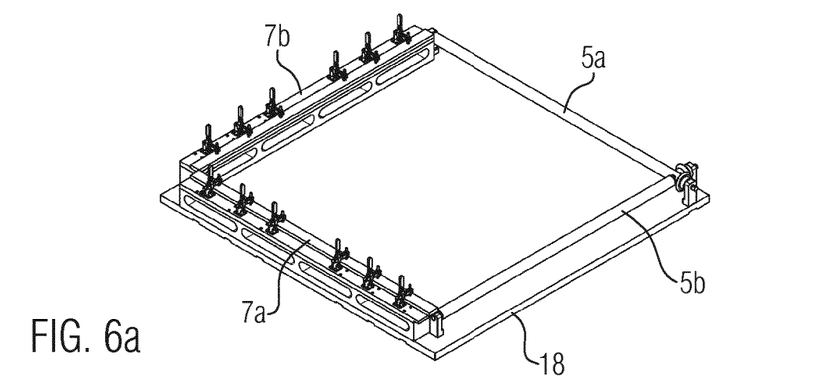
FIG. 6a shows another embodiment in which the weft and warp filaments of the fabric are stretched.

FIG. 6a shows a further embodiment that works similar to the embodiment in FIG. 3.

In this embodiment, two stretching elements 5a, 5b are provided at right angles on a base plate 18, which is square in this case, and are designed as roller elements as in FIG. 1a.

A first clamping element 7a is located opposite a first roll and a second clamping element 7b is located opposite a second roll. These clamping elements have two opposite jaws between which the corresponding ends of the resin-impregnated fiber material can be clamped.

After heating the material, the rovings can then be stretched in 90° direction to each other via the roller elements. In addition to aligning or stretching the rovings at an angle of 90° to each other, other angles or angle ranges such as 80°, 60°, 30° can also be covered, provided that two or more stretching elements and/or clamping elements are provided. The above mentioned values can each form the upper or lower limit of an angle range.

Figures 6B, 6D:
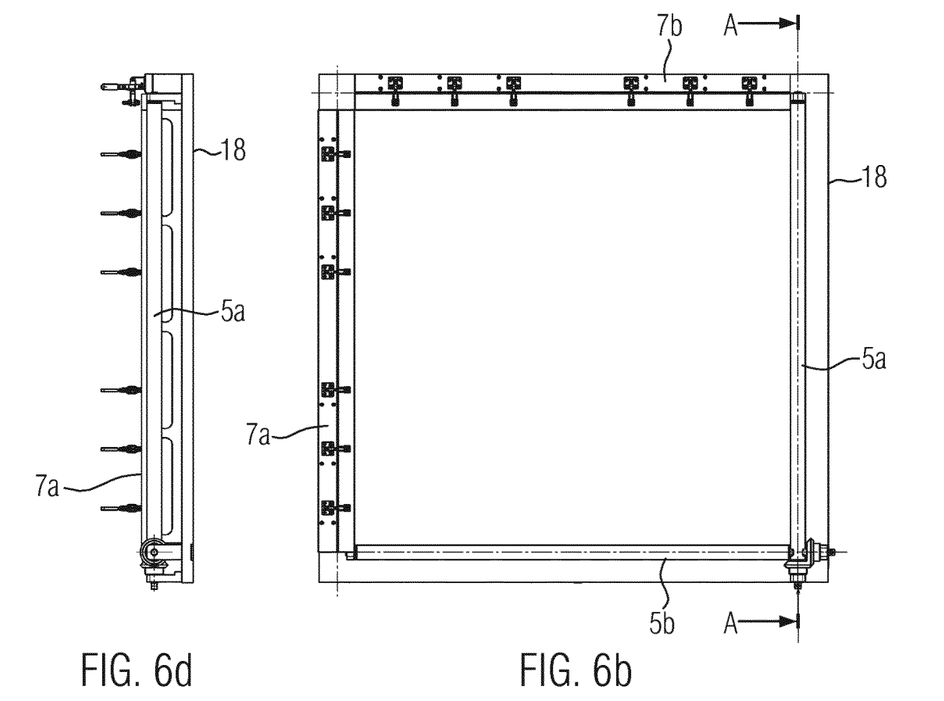

FIG. 6b shows a view of the device from FIG. 6a.

Figure 6C:
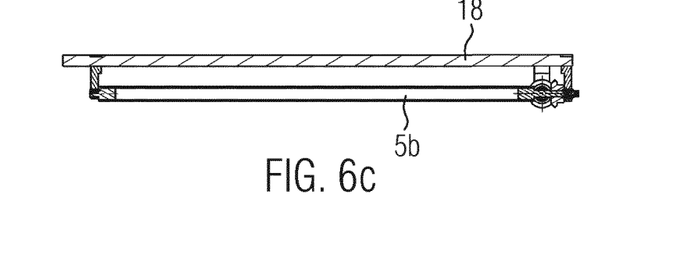
FIG. 6c shows a cross-sectional view of the device from FIG. 6a along the line B-B.

FIG. 6c shows a cross-sectional view along the line B-B in FIG. 6b.

FIG. 6d shows a cross-sectional view along the line A-A in FIG. 6b.

As far as the individual embodiments have been described above, the individual elements of the embodiments can also be combined with individual elements of other embodiments, as long as this is not objectively unreasonable.

The method according to the invention can be carried out in the described devices.

After stretching, the material is usually brought to its final shape or final form in a further step by the application of heat and/or pressure so that a component can be produced.

The component can be a motor vehicle component, an aircraft component or any other component made of fiber composite material.

The component is preferably a visible carbon component, e.g. one that is only coated with clear lacquer or where the fabric structure is visually visible.

In particular, carbon fiber filaments or a mixture containing at least carbon fibers are used as filament for the rovings. However, any other type of filament can be used.

REFERENCE SIGN LIST 1 stretching station
2 resin-impregnated fiber material
3 protruding ends
4 roving
5, 5a, 5b stretching element
6 opposing end
7, 7a, 7b clamping element
8 roll
9 heating device
10 cooling device
11a, 11b protective film
12 blank 13 removal station
14 rail segment
15 cutting station
16 robot
17 wheel
18 base plate
L longitudinal direction
Q transverse direction

The invention claimed is:

1. A method for producing a fiber-reinforced component comprising:
   providing a fiber material impregnated with resin and having a plurality of rovings adjacent one another extending in at least one direction; and
   stretching a section of the fiber material to align the rovings in their longitudinal direction by means of a frictional force is exerted on ends of the rovings that extend in one direction adjacent one another and that project from the resin-impregnated fiber material, wherein the rovings consist of weft and warp filaments, the ends of the rovings being exposed by removing one or more weft or warp filaments running transverse to said ends of the rovings to provide protruding free ends which delimit the fiber material,
   wherein during stretching substantially no vertical compressive force is exerted on the section of the fiber material being stretched,
   wherein the frictional force is generated by a stretching surface of a roller element which is rotated in the longitudinal direction of the rovings to be stretched and the rovings rest freely on the stretching surface of the roller element, and
   wherein at least before and/or during stretching, the fiber material is heated to at least soften the resin.

2. The method according to claim 1, in which the fiber material is arranged in a substantially planar configuration during stretching.

3. The method according to claim 1, in which stretching is applied to the weft and/or warp filaments so that the corresponding rovings align in their longitudinal direction.

4. The method according to claim 1, in which the rovings being stretched are fixed at an end opposite the end to which the frictional force is applied.

5. The method according to claim 1, in which the roller element is cylindrical with a round or angular cross-section.

6. The method according to claim 1, in which the roller element is heated.

7. The method according to claim 6, in which the warp filaments are stretched before, or after, or during the stretching of the weft filaments.

8. The method according to claim 1, in which different stretching elements are used, respectively, for stretching the warp filaments and the weft filaments.

9. The method according to claim 1, in which after stretching, the stretched resin-impregnated fiber material is cooled.

10. The method according to claim 9, in which an active relaxation of the stretched resin-impregnated fiber material is carried out after the stretching and/or cooling steps.

11. The method according to claim 10, in which the active relaxation is carried out by ultrasound and/or vibration means.

12. The method according to claim 1, in which a protective film previously applied to the resin-impregnated fiber material is removed before stretching, and after stretching, the stretched fiber material is covered with a protective film.

13. The method according to claim 1, in which the resin-impregnated fiber material is supplied from a roll or in the form of a sheet of a blank and after stretching, the stretched fiber material is formed into a roll.

14. The method according to claim 13, in which the roll or blank sheet form is taken from a storage area with a plurality of prefabricated resin-impregnated fiber material units and is fed to a stretching device.

15. The method according to claim 1, in which an optical inspection of the fiber material is carried out before, during and/or after stretching.

16. The method according to claim 1, in which at least two of the method steps are automated.

* * * * *